Patented Sept. 13, 1927.

1,642,209

UNITED STATES PATENT OFFICE.

MAURICE KAHN, OF PARIS, FRANCE, ASSIGNOR TO SOCIÉTÉ FRANCAISE DES PRODUITS ALIMENTAIRES AZOTES, OF PARIS, FRANCE.

PROCESS FOR THE MANUFACTURE OF NITROGEN-CONTAINING PRODUCTS.

No Drawing. Application filed March 26, 1925, Serial No. 18,604, and in France April 1, 1924.

In Indo-China considerable quantities of a liquid food are manufactured and consumed by the natives under the name of "nuoc-mam" (fish water), which is the result of repeated maceration of fish in salt or salt water. This liquid which the natives consume regularly provides them through the peptones that it contains and which are formed in the autodigestion of the flesh of the fish, with the complement of the nitrogen containing matters necessary for their food, which consists chiefly of hydrocarbons.

In the first operation in the preparation of nuoc-mam at least one part of salt is generally placed in contact with three parts of fish for about three days; after this treatment the saline solution which runs off from the mixture is again used, wholly or in part and either pure or diluted with salt solution, to wash the fish four or five times, each time allowing the liquid and fish to remain in contact for some time before extracting the greater quantity of matter which under the conditions in which the operations are carried out is soluble. The process however is not complete under three to five months.

Salt, in the quantities used by the Indo-Chinese manufacturers (i. e. in the proportion of about 200 to 250 grammes per litre of the final liquid) is a powerful antiseptic against infection of bacteriological origin, but in the course of manufacture it lessens and considerably reduces the autodigestion of the flesh of the fish caused by ferments during digestion; manufacture therefore requires the long period set out above.

I have discovered that when the fish is fresh an addition of salt or at least of such a quantity of salt as the one added by the natives is unnecessary whereby the objection derived from its use is obviated.

I find that if the fish to be treated are brought to and maintained at a temperature between 37° C. and 55° C. and adding to them only 5 to 10% of their weight of salt or if, without adding any salt, they are brought and maintained at a temperature of between 50 and 55° C. not only is no bacteriological infection produced but the autodigestion of the fish is extremely rapid and the manufacture of the liquid food is ended in a period of one to five days.

The process, applied without any use of salt, is above all satisfactory for the treatment of very fresh fish and for the treatment of fish of small size not containing a large quantity of fat. When on the other hand the fish is no longer fresh, or very large, or contains a large proportion of fat, it is necessary to use sodium chloride up to the amount set forth.

By this invention therefore fish flesh food is much more rapidly prepared and more completely autolyzed, while the flesh is treated under the conditions of temperature most favourable for their transformation, a condition which protects them at the same time against infection and which leads directly without having to eliminate any volatile antiseptic substance, to nitrogen containing products which are edible not only as relishes but also as food.

The fish to be treated may be maintained at the temperature indicated when in containers placed in a heated room or where double bottom or jacketed containers are heated either directly, or by steam or the like or by any other system.

It is to be remarked that the action of the small quantity of sodium chloride which may be eventually used in carrying out the process is such that it becomes possible to make the autolysis without any putrefaction at a temperature as low as 37° C.

In this case the slight antiseptic action of common salt is combined with the accelerating action of the temperature. The greater the quantity of common salt employed (but always remaining very small in respect of the huge quantities used by the Indo-Chinese) the less the temperature may be; there is however no advantage in employing a temperature below the approximate temperature above indicated.

As a matter of fact this small quantity of sodium chloride has been found sufficient:

1. To ensure complete security during autolysis whatever kind of fish is used and even when the fish is not very fresh;

2. To allow a temperature lower than 50° C. to be used and this temperature may be as low as 37° C;

3. To ensure the preservation of the nitrogenous pastes obtained;

4. To ensure more easy separation of the oils from the fish; the presence of salt, even in a small quantity, has been found to facilitate the destruction of the fatty emulsions.

On the other hand the use of sodium chloride in small proportions:

1. Does not slow down autolysis at the temperatures in question;
2. Does not yield as in the process used by the Indo-Chinese (to 25% of salt) nitrogenous juices or pastes whose high proportion of salt was a defect as regards food.

In such a case the process may, by way of example, be carried out in the following manner: Fish whether broken up or not has added to it according to (1) its state of freshness (2) the size of the pieces used and their fatty content from 5 to 10% of its weight of common salt. It is placed in heating rooms or in containers heated to the desired temperature, i. e. between 37° and 55° C. At the completion of autolysis a portion of the fish oil collects on the surface of the liquid. It is recovered by decantation or by any other industrial means, then sieved and the skeleton débris remaining on the sieve furnishes: on the one hand a fish oil and on the other hand powders whose nitrogen and phosphorus content provide a manure of satisfactory quality. The liquid portion is filtered; there is recovered (1) on the filter, nitrogen residues due to the incomplete digestion of certain proteins and containing a fairly high proportion of fats. This residue may again be employed as such as a tanning product (degras and confit) or may have its fatty content extracted yielding a fresh quantity of fish oil and a nitrogenous manure, (2) a liquid from which a portion of oil escaping the first separation can still be extracted, and which constitutes the nitrogenous juices; these may be consumed either in the form of a liquid or after concentration, in the form of a paste.

The product obtained may be salted to the tastes of the consumer and the period for which it is to be preserved. The product may be concentrated and even brought into a pasty consistence before or after salting or without salting. Flavourings or aromatic bodies may be added.

What I claim is:

1. A process for the manufacture of nitrogen containing products by means of autodigestion of fish which consists in bringing and maintaining fish during one to five days at a temperature comprised between 37° C. and 55° C. in presence of an amount of sodium chloride not exceeding 10%.

2. A process for the manufacture of nitrogen containing products by means of autodigestion of fish which consists in bringing and maintaining fish during two to four days at a temperature comprised between 50° C. and 55° C. without the addition of sodium chloride.

3. A process for the manufacture of nitrogen containing products by means of autodigestion of fish which consists in bringing and maintaining fish during one to five days at a temperature comprised between 37° C. and 55° C. in presence of an amount of sodium chloride not exceeding 10% the percentage of sodium chloride being higher as the autolysis is carried out at a lower temperature.

4. A process for the manufacture of nitrogen containing products by means of autodigestion of fish which consists in bringing and maintaining fish during one to five days at a temperature comprised between 37° C. and 55° C. in presence of an amount of sodium chloride not exceeding 10% and collecting the oils freed during the course of the autolysis.

5. A process for the manufacture of nitrogen containing products by means of autodigestion of fish which consists in bringing and maintaining fish during one to five days at a temperature comprised between 37° C. and 55° C. in presence of an amount of sodium chloride not exceeding 10% and collecting at separated operations the oils freed during the course of the autolysis.

6. A process for the manufacture of nitrogen containing products by means of autodigestion of fish which consists in bringing and maintaining fish during one to five days at a temperature comprised between 37° C. and 55° C. in presence of an amount of sodium chloride not exceeding 10% and collecting under the shape of degras and of free oils the oils freed during the course of the autolysis.

In testimony whereof I affix my signature.

MAURICE KAHN.